United States Patent
Sugai et al.

(10) Patent No.: US 8,343,604 B2
(45) Date of Patent: Jan. 1, 2013

(54) SYNTHETIC RESIN CONTAINER WITH HIGH BARRIER PROPERTIES

(75) Inventors: Masahiro Sugai, Isehara (JP); Hiromi Shimura, Isehara (JP); Masato Suzuki, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 87 days.

(21) Appl. No.: 12/934,748

(22) PCT Filed: Feb. 23, 2009

(86) PCT No.: PCT/JP2009/053192
§ 371 (c)(1),
(2), (4) Date: Oct. 21, 2010

(87) PCT Pub. No.: WO2009/122820
PCT Pub. Date: Oct. 8, 2009

(65) Prior Publication Data
US 2011/0036850 A1    Feb. 17, 2011

(30) Foreign Application Priority Data
Mar. 31, 2008   (JP) .................................. 2008-093490

(51) Int. Cl.
*B29D 22/00* (2006.01)
(52) U.S. Cl. .................. 428/36.6; 428/36.91; 428/36.7; 428/35.7; 215/12.1
(58) Field of Classification Search .................. 428/35.7, 428/36.6, 36.7, 36.91; 215/12.1; 220/660, 220/62.11, 62.12
See application file for complete search history.

(56) References Cited

U.S. PATENT DOCUMENTS

| 4,501,781 | A | * | 2/1985 | Kushida et al. | 215/12.2 |
| 5,175,238 | A | | 12/1992 | Matlack et al. | |
| 6,410,156 | B1 | | 6/2002 | Akkapeddi et al. | |
| 6,680,094 | B2 | * | 1/2004 | Kikuchi et al. | 428/36.6 |
| 6,720,053 | B2 | | 4/2004 | Tai et al. | |
| 2002/0146527 | A1 | * | 10/2002 | Kikuchi et al. | 428/35.7 |

(Continued)

FOREIGN PATENT DOCUMENTS
EP    1 475 308 A1    11/2004
(Continued)

OTHER PUBLICATIONS

Chinese Office Action in Chinese Patent Application No. 200980117240.7; dated Nov. 24, 2011 (with English-language translation).

(Continued)

*Primary Examiner* — N. Edwards
(74) *Attorney, Agent, or Firm* — Oliff & Berridge, PLC

(57) ABSTRACT

A container made of synthetic resin which does not cause whitening or clouding in an unstretched portion even after long-period storage and which has excellent barrier properties. A PET bottle comprising a substrate layer made of PET and a barrier layer having a gas permeability lower than that of the substrate layer, wherein the barrier layer is made of a barrier material prepared by incorporating a polyamide containing m-xylene groups with an amorphous polyamide comprising both m-xylene isophthalamide structures and hexamethylene isophthalamide structures. A copolyamide composed of both a copolymer of m-xylenediamine and isophthalic acid and a copolymer of hexamethylenediamine and isophthalic acid is used as the amorphous polyamide. The content of the amorphous polyamide in the barrier layer is adjusted to 15 to 25 wt %.

14 Claims, 1 Drawing Sheet

U.S. PATENT DOCUMENTS

| | | | |
|---|---|---|---|
| 2005/0009976 A1 | 1/2005 | Akkapeddi et al. | |
| 2006/0230553 A1* | 10/2006 | Thullen et al. .................... | 8/564 |
| 2007/0294841 A1* | 12/2007 | Thullen et al. .................... | 8/516 |
| 2008/0167415 A1* | 7/2008 | Stoeppelmann et al. ..... | 524/494 |
| 2011/0036850 A1* | 2/2011 | Sugai et al. .................. | 220/660 |

FOREIGN PATENT DOCUMENTS

| | | |
|---|---|---|
| EP | 1 974 901 A1 | 10/2008 |
| JP | A-07-005831 | 1/1995 |
| JP | B2-07-005831 | 1/1995 |
| JP | A-09-095532 | 4/1997 |
| JP | A-11-049941 | 2/1999 |
| JP | A-2001-10675 | 1/2001 |
| JP | B2-3154392 | 4/2001 |
| JP | A-2007-008582 | 1/2007 |
| JP | A-2009-35286 | 2/2009 |
| KR | 10-2004-0088455 | 10/2004 |
| KR | 10-2005-0008763 | 1/2005 |
| WO | WO 2009/032596 A1 | 3/2009 |

OTHER PUBLICATIONS

International Search Report in International Application No. PCT/JP2009/053192; dated Mar. 24, 2009 (with English-language translation).

Notice of Office Action dated Apr. 12, 2012 in Korean Patent Application No. 10-2010-7023266 (with translation).

Australian Office Action dated Oct. 5, 2011 from Australian Patent Application No. 2009233093.

Canadian Office Action dated Apr. 13, 2012 for Canadian Patent Application No. 2,720,127.

Extended European Search Report dated Oct. 2, 2012 from European Patent Application No. 09 729 109.0.

Chinese Office Action dated Sep. 17, 2012 from Chinese Patent Application No. 200980117240.7 (with English-language translation).

* cited by examiner

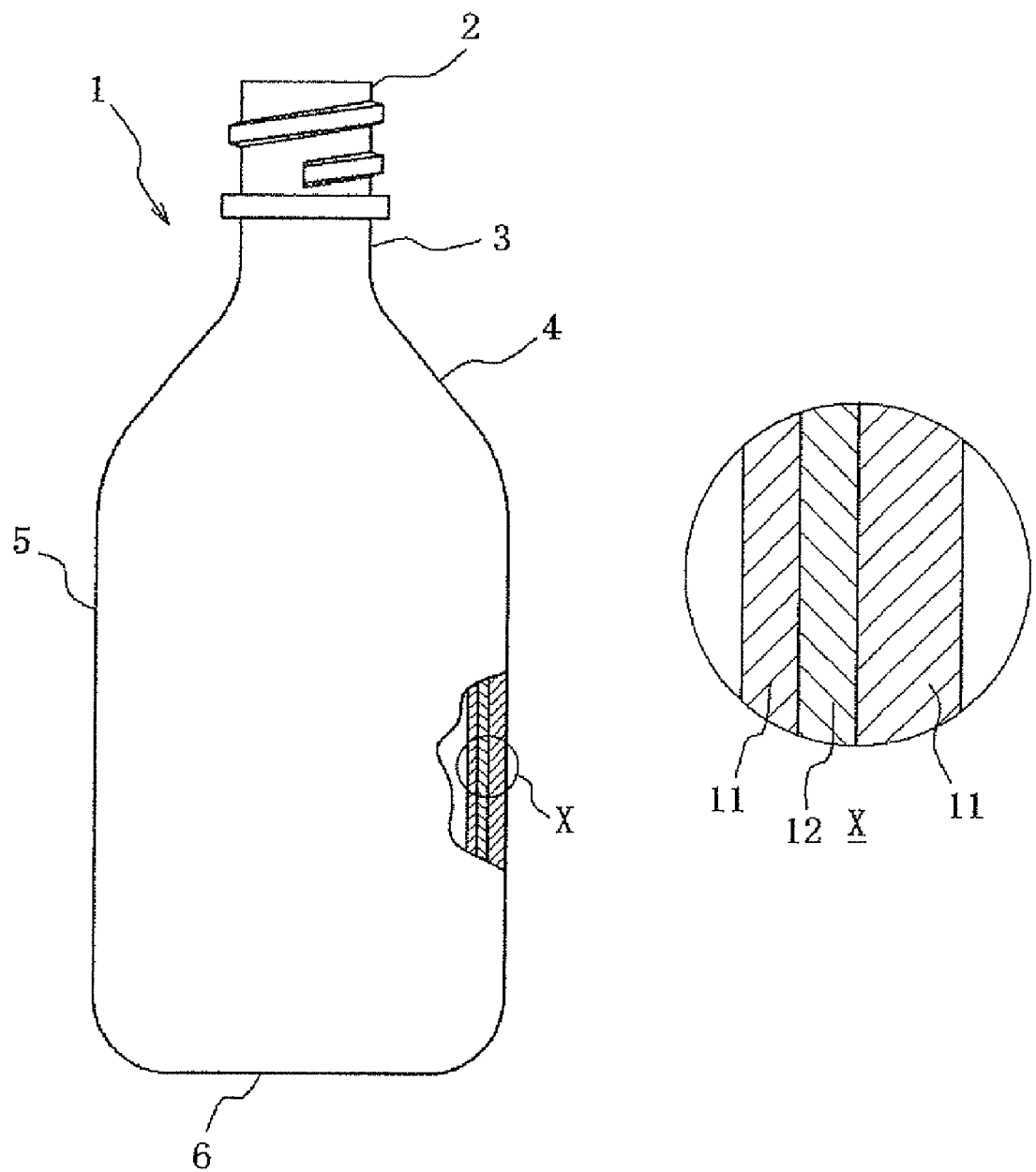

SYNTHETIC RESIN CONTAINER WITH HIGH BARRIER PROPERTIES

TECHNICAL FIELD

The present invention relates to a synthetic resin container with high barrier properties, which container comprises a base layer composed of a synthetic resin and a barrier layer with lower gas permeability than that of the base layers.

RELATED ART

It is known that a synthetic resin container such as a PET (polyethylene terephthalate) bottle allows a small amount of oxygen, carbon dioxide and the like to permeate it. In order to prevent the permeation, a PET bottle with base layers composed of PET resin and a gas barrier layer laminated thereon is suggested (See JP2007-8582 A.).

DISCLOSURE OF THE INVENTION

However, in producing such a container in the blow molding method, white opacity may be generated in a non-stretched part of the blow molding product, for example, a neck part of a bottle, if the product is stored for a long period of time. The white opacity may cause bad appearance of the container even though the intrinsic properties of the container are not suffered.

In this respect, the inventor of the present application has found out that the white opacity is caused in the gas barrier layer. If polyamide MXD6 (product of Mitsubishi Gas Chemical Company, Inc.), which is obtained by condensation polymerization of meta-xylene diamine and adipic acid, is used, the white opacity is caused by crystallization of MXD6. It is considered that the crystallization of MXD6 is enhanced by decrease in glass transition temperature and crystallization temperature caused by increase in moisture content of MXD6.

Therefore, the inventor of the present application has recognized that the generation of the white opacity in the non-stretched part may be suppressed by increasing crystallization temperature of at least the gas barrier layer.

Document 1: JP2007-8582 A

PROBLEMS TO BE SOLVED BY THE INVENTION

Thus, the problem to be solved by the invention is the white opacity which may be generated in a non-stretched part of the blow molding product when the synthetic resin container is produced in the blow molding method and stored for a long period of time. The invention aims to provide a synthetic resin container with high barrier properties, in which white opacity is not generated in the non-stretched part in spite of a long-term storage of the product.

MEANS TO SOLVE THE PROBLEMS

According to the invention, a synthetic resin container with high barrier properties, comprising a base layer composed of a synthetic resin and a barrier layer with lower gas permeability than that of the base layer is characterized in that the barrier layer is composed of a synthetic resin having peak crystallization temperature of 150° C. or more.

"Peak crystallization temperature" as used herein means a temperature calculated based on the properties of calorific value due to the crystallization measured by means of differential scanning calorimeter (DSC). In the present invention, peak crystallization temperature is obtained after heating from 20° C. to 270° C. at a rate of temperature rise of 10° C./min and maintaining the heated state for five minutes, and then, once icing to 20° C. and again heating from 20° C. to 270° C. at a rate of temperature rise of 10° C./min.

A more preferable range of peak crystallization temperature is 150° C. or more and 170° C. or less.

A barrier layer according to the invention may contain an amorphous polyamide having meta-xylene isophthalamide structure and hexamethylene isophthalamide structure, and the content rate of the amorphous polyamide in the barrier layer is 15 weight percentage or more and 25 weight percentage or less.

In an exemplary embodiment, the barrier layer may be composed of the amorphous polyamide and a barrier material with lower gas permeability than that of the base layer, the barrier material being polyamide containing meta-xylene group. The polyamide containing meta-xylene group may be polyamide obtained by condensation polymerization of meta-xylene diamine and adipic acid.

The amorphous polyamide may include a copolyamide (MXDI/6I) of a copolymer of meta-xylene diamine and isophthalic acid (MXDI: poly meta-xylene isophthalamide) and a copolymer of hexamethylene diamine and isophthalic acid (6I: poly hexamethylene isophthalamide). The base layer may be composed of polyethylene terephthalate.

According to the invention, a synthetic resin whose peak crystallization temperature is obtained after heating from 20° C. to 270° C. at a rate of temperature rise of 10° C./min and maintaining the heated state for five minutes, and then, once icing to 20° C. and again heating from 20° C. to 270° C. at a rate of temperature rise of 10° C./min, is used to suppress the white opacity at the non-stretched part.

That is, according to the present invention, gas barrier properties can be maintained over a long period of time without deteriorating good appearance. Therefore, according to the invention, a synthetic resin container with high barrier properties can be provided, in which white opacity is hardly generated even after the container is stored for a long period of time.

The invention employs, as the barrier layer, the synthetic resin which contains the amorphous polyamide having meta-xylene isophthalamide structure and hexamethylene isophthalamide structure and which has the content rate of the amorphous polyamide in the barrier layer of 15 weight percentage or more and 25 weight percentage or less to realize an effective prevention of white opacity in an easy way.

Moreover, when the barrier layer is composed of the amorphous polyamide and a barrier material with lower gas permeability than that of the base layer, the white opacity can be effectively prevented by using polyamide containing meta-xylene group as the barrier material.

Furthermore, white opacity can be further effectively prevented if the copolyamide of a copolymer of meta-xylene diamine and isophthalic acid (MXDI) and a copolymer of hexamethylene diamine and isophthalic acid (6I) is used as the amorphous polyamide according to the invention.

BRIEF DESCRIPTION OF THE DRAWINGS

FIG. 1 is a partially cut-away side view of a PET bottle 1 according to the present invention.

REFERENCE NUMERALS

1 PET bottle
2 mouth
3 neck
4 shoulder
5 barrel
6 bottom
11 base layers
12 gas barrier layer

BEST MODE FOR CARRYING OUT THE INVENTION

An embodiment of the present invention will be now described with reference to the accompanying drawing.

FIG. 1 is a partially cut-away side view of a PET bottle 1 according to the present invention.

The reference numeral 1 denotes a blow molding bottle (hereinafter simply referred to as "bottle"). The bottle has mouth 2, neck 3, shoulder 4, barrel 5 and bottom 6. The bottle 1 is a laminated body comprising inner and outer base layers 11 having forming the basic shape of the bottle body and a gas barrier layer 12 disposed between the base layers 11.

The base layers 11 are composed of a synthetic resin whose main component is polyethylene terephthalate resin (hereinafter referred to as "PET resin".

Used as the gas barrier layer 12 is a synthetic resin which has the peak crystallization temperature Tpc of 150° C. or more and 170° C. or less after a first process (hereinafter referred to as "1st_Run") in which the synthetic resin is heated from 20° C. to 270° C. at a rate of temperature rise of 10° C./min and then allowed at the heated state for a five minutes, and a second process (hereinafter referred to as "2nd_Run") in which the synthetic resin is once cooled to 20° C. with ice and again heated from 20° C. to 270° C. at a rate of temperature rise of 10° C./min.

In an exemplary embodiment, used is a gas barrier layer which contains a barrier material with lower gas permeability than that of the base layers 11 as a main component and the amorphous polyamide having meta-xylene isophthalamide structure and hexamethylene isophthalamide structure (hereinafter referred to as "amorphous polyamide").

Furthermore, polyamide containing meta-xylene group such as a copolymer of meta-xylene diamine and adipic acid may be recited as the barrier material by way of example.

As amorphous polyamides, a copolymer of meta-xylene diamine and isophthalic acid (MXDI) and a copolymer of hexamethylene diamine and isophthalic acid (6I) may be recited by way of example.

The content rate of the amorphous polyamide in the barrier layer 12 is in the range of 15 weight percentage or more and 25 weight percentage or less. Accordingly, mixing rate (weight ratio) of barrier material and the amorphous polyamide is 85:15 to 75:25.

According to the invention, a synthetic resin having the peak crystallization temperature Tpc of 150° C. or more and 170° C. or less after 2nd_Run is used as the gas barrier layer 12 to suppress white opacity at the neck 3 which is the non-stretched part even after the blow molding product is stored for a long period of time.

In this way, the bottle 1 can maintain good gas barrier properties over a long period of time without deteriorating its appearance. Thus, according to the invention, it is possible to provide a synthetic resin container with high barrier properties which suppresses white opacity even after the container is stored for a long period of time.

Specifically, the embodiment employs, as the barrier layer 12, the synthetic resin which contains the amorphous polyamide having meta-xylene isophthalamide structure and hexamethylene isophthalamide structure and which has the content rate of the amorphous polyamide in the barrier layer 12 of 15 weight percentage or more and 25 weight percentage or less to realize an effective prevention of the white opacity in an easy way.

In addition, as with the embodiment, when the barrier layer 12 is composed of the amorphous polyamide and a barrier material with lower gas permeability than that of the base layers 11 (PET resin in this embodiment), the white opacity can be effectively prevented by using polyamide containing meta-xylene group.

Furthermore, white opacity can be further effectively prevented if a copolyamide of a copolymer of meta-xylene diamine and isophthalic acid (MXDI) and a copolymer of hexamethylene diamine and isophthalic acid (6I) is used as the amorphous polyamide according to the invention.

It is noted that configuration of the layers according to the invention is not limited to that of the aforementioned embodiment and at least two layers, that is a base layer 11 and a gas barrier layer 12 may be included. According to the invention, bottle 1 can be shaped with the gas barrier layer 12 alone.

EXAMPLES

Now, evaluation of the embodiments of the present invention and the comparative examples measured in a method compliant with JIS K 7121 is shown.

Samples used in the evaluation are prepared as follows: firstly, the base layers 11 are removed from the bottle 1 shown in FIG. 1, which has the total weight of 32 g and the capacity of 500 ml, and then, a part of the gas barrier layer 12 of the neck 3, equal to the amount of 10 mg, is used as a test piece. The differential scanning calorimeter DSC6220 (manufactured by STINT) is used as the measuring device.

The measured values in the following Table 1 to 3 show extrapolated crystallization temperature Tic, peak crystallization temperature Tpc and extrapolated crystallization end temperature Tec, respectively, and the unit system for additive amount is wt % (weight percentage).

The respective measured values of Tables 1 to 3 are obtained after the test pieces are subjected to the "1st_Run" for heating from 20° C. to 270° C. at a rate of temperature rise of 10° C./min and then allowing at the heated state for a five minutes, and then to the "2nd_Run" for once cooling to 20° C. with ice and again heating from 20° C. to 270° C. at a rate of temperature rise of 10° C./min.

The barrier layer of the non-stretched part of the mouth 2 is used as a sample in Table 1. The barrier layer of the barrel 4, which is a stretched part, is used as a sample in Table 2.

TABLE 1

|  | MXD6 Mixing rate (%) | HB FE7103 rate (%) | Tic (° C.) | Tpc (° C.) | Tec (° C.) | Temperature difference (Tec-Tic) |
|---|---|---|---|---|---|---|
| Comparative Example 1 | 100 | 0 | 132.6 | 140.0 | 145.4 | 12.8 |
| Comparative Example 2 | 90 | 10 | 134.3 | 140.1 | 144.3 | 10.0 |
| Example 1 | 85 | 15 | 146.6 | 155.5 | 163.1 | 16.5 |
| Example 2 | 80 | 20 | 151.9 | 160.7 | 168.8 | 16.9 |
| Example 3 | 75 | 25 | 157.8 | 167.1 | 176.0 | 18.2 |

TABLE 2

|  | MXD6 Mixing rate (%) | HB FE7103 Mixing rate (%) | Tic (° C.) | Tpc (° C.) | Tec (° C.) | Temperature difference (Tec-Tic) |
|---|---|---|---|---|---|---|
| Comparative Example 1 | 100 | 0 | 129.5 | 136.4 | 141.9 | 12.4 |
| Comparative Example 2 | 90 | 10 | 133.3 | 138.7 | 143.3 | 10.0 |
| Example 1 | 85 | 15 | 145.4 | 153.7 | 160.9 | 15.5 |
| Example 2 | 80 | 20 | 152.3 | 161.9 | 171.1 | 18.8 |
| Example 3 | 75 | 25 | 156.6 | 166.1 | 175.9 | 19.3 |

The sample in Comparative Example 1 is composed only of the barrier material of MXD6 (s0611 manufactured by Mitsubishi Gas Chemical Company, Inc.). The sample in Comparative Example 2 is a mixture of MXD6 as the barrier material and the amorphous polyamide (Grivory HB FE7013 manufactured by EMS Corp.) at the rate of 90:10.

The barrier material and the amorphous polyamide are used as a sample at the rate of 85:15, 80:20 and 75:25, respectively in Examples 1 to 3.

Comparative Examples 1, 2 and Examples 1 to 3 are stored under the condition of 23° C.-55% RH, filled with water, respectively. White opacity was generated on the neck 3 on the 46th day in the case of Comparative Example 1 and also on the 70th day in the case of Comparative Example 2, while white opacity is not generated in Examples 1 to 3 even after 3 months.

In comparison to this, Comparative Examples 1, 2 and Examples 1 to 3 are stored under the condition of 40° C.-75% RH, filled with water, respectively. White opacity on the neck 3 is generated on the 8th day and 11th day in Comparative Examples 1 and 2, respectively. Similarly, white opacity on the neck 3 is generated on the 12th day, on the 14th day, on the 14th day in Examples 1 to 3, respectively.

TABLE 3

|  | 23° C.-55% RH | 40° C.-75% RH |
|---|---|---|
| Comparative Example 1 | White opacity on the 46th day | White opacity on the 8th day |
| Comparative Example 2 | White opacity on the 70th day | White opacity on the 11th day |
| Example 1 | White opacity after 3 months | White opacity on the 12th day |
| Example 2 | White opacity after 3 months | White opacity on the 14th day |
| Example 3 | White opacity after 3 months | White opacity on the 14th day |

It is apparent from Tables 1 to 3 that the more the temperature difference between the extrapolated crystallization end temperature Tec and the extrapolated crystallization temperature Tic is, the less white opacity is generated.

The following Table 4 shows the measurement result of the midpoint glass transition temperature Tmg, the peak crystallization temperature Tpc and the peak melting temperature Tpm with respect to 1st_Run and 2nd_Run.

TABLE 4

|  |  | Tmg (° C.) | Tpc (° C.) | Tpm (° C.) |
|---|---|---|---|---|
| Comparative Example 1 | 1st_Run | 49.3 | 114.2 | 238.2 |
|  | 2nd_Run | 84.0 | 140.1 | 237.3 |
| Example 1 | 1st_Run | 51.7 | 108.3 | 235.7 |
|  | 2nd_Run | 91.3 | 155.3 | 234.5 |
| Example 2 | 1st_Run | 53.5 | 123.6 | 235.4 |
|  | 2nd_Run | 92.7 | 160.8 | 233.9 |
| Example 3 | 1st_Run | 53.6 | 129.6 | 233.5 |
|  | 2nd_Run | 95.5 | 167.2 | 232.2 |

Furthermore, Table 5 shows the DSC measurement result of the midpoint glass transition temperature Tmg, the peak crystallization temperature Tpc and the peak melting temperature Tpm of a part of the test piece from the gas barrier layer 12 of the neck 3 at about 2% of water absorption rate. The water absorption rate is measured by Karl Fischer Moisture Titrator MKC-610 at measurement temperature of 180° C.

TABLE 5

|  | Water Absorption Rate |  | Tmg | Tpc | Tpm |
|---|---|---|---|---|---|
| Comparative Example 1 | 2.0 | 1st_Run | 46.4 | 114.0 | 237.8 |
|  | — | 2nd_Run | 84.0 | 140.1 | 237.3 |
| Example 1 | 2.2 | 1st_Run | 51.7 | 108.3 | 235.7 |
|  | — | 2nd_Run | 91.3 | 155.3 | 234.5 |
| Example 2 | 2.0 | 1st_Run | 52.6 | 135.2 | 235.3 |
|  | — | 2nd_Run | 92.7 | 160.8 | 233.9 |
| Example 3 | 1.8 | 1st_Run | 53.4 | 137.5 | 233.9 |
|  | — | 2nd_Run | 95.5 | 167.2 | 232.2 |

It is apparent from the measurement result shown in Table 5 that the glass transition temperature and the crystallization temperature decrease, as the absorption rate increases. Accordingly, generation of white opacity in the non-stretched part causes the rise of crystallization temperature and it is apparent that the same applies to the glass transition temperature.

INDUSTRIAL APPLICABILITY

The container according to the present invention is not limited to a bottle and can be applied for any containers in various forms as far as they are to keep the quality of the content.

What is claimed is:

1. A synthetic resin container with high barrier properties comprising a base layer composed of a synthetic resin and a barrier layer with lower gas permeability than that of the base layer, wherein the barrier layer is composed of a synthetic resin with peak crystallization temperature between 150° C. to 170° C.

2. The synthetic resin container according to claim 1, wherein the barrier layer is a synthetic resin containing an amorphous polyamide having meta-xylene isophthalamide structure and hexamethylene isophthalamide structure and the content rate of the amorphous polyamide in the barrier layer is in the range of 15 weight percentage or more and 25 weight percentage or less.

3. The synthetic resin container according to claim 1, wherein the barrier layer is composed of the amorphous polyamide and a barrier material with lower gas permeability than that of the base layer, and the barrier material is polyamide containing meta-xylene group.

4. The synthetic resin container according to claim 2, wherein the amorphous polyamide is a copolyamide (MXDI/6I) of a copolymer of meta-xylene diamine and isophthalic acid (MXDI) and a copolymer of hexamethylene diamine and isophthalic acid (6I).

5. The synthetic resin container according to claim 1, wherein the base layer is composed of polyethylene terephthalate.

6. The synthetic resin container according to claim 2, wherein the barrier layer is composed of the amorphous polyamide and a barrier material with lower gas permeability than that of the base layer, and the barrier material is polyamide containing meta-xylene group.

7. The synthetic resin container according to claim 3, wherein the amorphous polyamide is a copolyamide (MXDI/6I) of a copolymer of meta-xylene diamine and isophthalic acid (MXD1) and a copolymer of hexamethylene diamine and isophthalic acid (6I).

8. The synthetic resin container according to claim 6, wherein the amorphous polyamide is a copolyamide (MXDI/6I) of a copolymer of meta-xylene diamine and isophthalic acid (MXDI) and a copolymer of hexamethylene diamine and isophthalic acid (6I).

9. The synthetic resin container according to claim 2, wherein the base layer is composed of polyethylene terephthalate.

10. The synthetic resin container according to claim 3, wherein the base layer is composed of polyethylene terephthalate.

11. The synthetic resin container according to claim 6, wherein the base layer is composed of polyethylene terephthalate.

12. The synthetic resin container according to claim 4, wherein the base layer is composed of polyethylene terephthalate.

13. The synthetic resin container according to claim 7, wherein the base layer is composed of polyethylene terephthalate.

14. The synthetic resin container according to claim 8, wherein the base layer is composed of polyethylene terephthalate.

* * * * *